United States Patent Office 3,808,180
Patented Apr. 30, 1974

3,808,180
COMPOSITE INTERPOLYMER AND LOW HAZE IMPACT RESISTANT THERMOPLASTIC COMPOSITIONS THEREOF
Frederick Hammann Owens, Willingboro, N.J., assignor to Rohm and Haas Company, Philadelphia, Pa.
No Drawing. Continuation of abandoned application Ser. No. 27,996, Apr. 13, 1970. This application Feb. 9, 1972, Ser. No. 224,912
Int. Cl. C08f 15/18
U.S. Cl. 260—885
29 Claims

ABSTRACT OF THE DISCLOSURE

Rigid thermoplastics, such as acrylic polymers and vinyl halide polymers are modified to impart high impact resistance. Modified rigid acrylic thermoplastics retain clarity upon exposure with a modification of a particular acrylic elastomer having a minimum attachment level to the rigid phase of 20 percent. The elastomer comprises at least 50 weight percent alkyl or aralkyl acrylate, 0.05 to 5.0 weight percent of a graft-linking monomer, 0.05 to 5.0 weight percent of a cross-linking monomer and 0 to 10.0 weight percent of a hydrophilic monomer. The elastomer can be present in an amount ranging from 0.5 to 50 weight percent of the total modified material, and can be prepared integrally with the rigid phase or as a separate additive comprising elastomer and attached rigid phase.

---

This is a continuation of application Ser. No. 27,996, filed Apr. 13, 1970, now abandoned.

Rigid thermoplastic polymers are a class of compounds well-known in the art used for their balance of physical properties, economy, availability, and lack of suitable substitutes. A widely used category of these rigid thermoplastics is the acrylic polymers such as poly (methyl methacrylate), and many copolymers of methyl methacrylate, and the modified versions thereof.

These thermoplastic polymers, being rigid, are susceptible to breakage during the manufacture, processing, shipment, and use of the plastic part.

It is known that large quantities of elastomeric materials may be added to these rigid thermoplastic polymers to provide improved resistance to sharp, high velocity impact. These elastomers are added in variable quantities, ordinarily at least 5 percent and generally at least 15 percent based on the weight of a molding composition to improve impact properties. At the 20 percent elastomer level, the impact strength of polymethyl methacrylate is substantially improved but 25 to 30 percent elastomer is required to produce a truly impact resistant material with up to 50 percent being added in some cases. In other cases, where breakage occurs during removal of molded parts from a mold, amounts of elastomer less than 5 percent can effect substantial improvement. Amounts on the order of 0.5 to 5.0 percent are often effective for this latter purpose. Although the inclusion of a discontinuous elastomeric phase has succeeded in providing substantial impact resistance such improvement has been at the expense of the optical properties of the rigid thermoplastics.

It is possible to maintain the color and/or transparency of the rigid phase by refractive index matching, control of particle size, and the like, but heretofore, there has been a significant haze level in the initial product. This haze progressively increases upon exposure to water, either by immersion or by exposure to high levels of humidity. The effect upon exposure to water is accelerated by heat. The hazing phenomenon manifests itself as the development of a whiteness, which upon examination is found to occur through the entire body of the material and not merely on the surface, although the effect is ordinarily most pronounced thereat. The whiteness progressively increases with continued exposure to water, e.g. by intermittent or continuous immersion or exposure to the elements, until the material becomes opaque. Continued exposure eventually results in crazing and ultimate failure of the material.

It is theorized that haze occurs when water penetrates the material, because of the presence of polymerization ingredients, such as initiators, modifiers, chain transfer agents, soaps and emulsifiers, and the like. Residual amounts of such materials are inevitable inclusions in a polymer when they are included in the polymerization mix, and the removal of such extraneous matter is severely restricted by both technological and economic considerations.

The effect of the water upon the polymeric materials is readily apparent. The nature of the effect is not conclusively known, however, and several explanations have been offered. It is probable that haze formation is a complex effect, attributable to a number of causes. One explanation is that the water that penetrates the polymer is adsorbed or absorbed by the elastomeric phase, changing the refractive index, and thereby interrupting the careful index matching of the components. It has also been suggested that the water collects at the "interface" of the rigid and elastomeric phases, creating a microvoid. The microvoid would interrupt the refractive index matching and would also induce stress which would subsequently cause the microvoid to propagate, thus producing the crazing. Such explanations and theoretical considerations do not constitute a part of the present invention and are not to be considered binding upon the scope thereof.

The adverse nature of haze upon the highly impact resistant materials heretofore available makes the preparation of a high impact thermoplastic resin without such characteristics a highly desirable end.

It is, accordingly, an object of the present invention to provide impact resistant rigid thermoplastic molding compositions with improved physical and chemical characteristics. It is further an object to provide molding compositions which resist breakage but provide a balance of physical characteristics approximately equal to or better than the impact modified rigid thermoplastic polymers of the prior art. The present invention realizes the above objects and reduces or eliminates the deficiencies of the compositions in the prior art and retention of impact resistance upon weathering.

Among the particular advantages to be obtained in accordance with the present invention are the provisions of rigid thermoplastic compositions which have excellent initial impact resistance, and which retain high levels of impact resistance after working and forming, i.e., mechanical mixing on calender rolls, in mechanical mixers, extruding into sheet, film, or shaped forms, compression or injection molding and the like, and further retain such high impact resistance in use, even upon exposure to environmental effects such as high temperatures, ultra-violet light, water in the form of high humidity or rain or other aqueous environs, and still other elements generally included in discussions of weathering, which expression is to be considered generic to such environmental influences broadly. Further, the rigid thermoplastics provided by the present invention include materials which can have predetermined and controlled optical characteristics which are excellent and which are likewse retained upon working, forming, use, and exposure. Still other properties and characteristics are also notably improved by the present invention, such as the handling characteristics of components, intermediates, and products; the processing characteristics are also much improved, including such factors as blending characteristics, die swell, the occurrence of non-laminar flow in molding processes, with attendant facility in filling molds and the formation of high quality molded products. Materials prepared in accordance with the present invention also show excellent resistance to staining by contact with extraneous materials, notably lipstick and similar compositions.

While all the rigid thermoplastic materials disclosed and contemplated in the present disclosure benefit to some extent from the foregoing advantages, some types of rigid materials benefit more notably in some than in others. For example, impact modified acrylic type thermoplastics are much more susceptible to the formation of water haze, and the attendant whitening of clear, colorless articles or materials. Or in the case of colored or pigmented materials, an undesirable color change and chalking occurs. Impact modifications of rigid acrylic thermoplastics as hereinafter disclosed results in the elimination or substantial reduction of haze problems. Vinyl halide polymers, on the other hand, are far more susceptible to staining when modified with the impact modifiers of the prior art; when modified in accordance with the present invention, staining is substantially eliminated.

The invention comprises a novel acrylic-based composite interpolymer material having a first phase of an elastomer and a second phase, at least in part, chemically linked to the elastomer core, of a rigid thermoplastic. The composite material can be so formulated that it can be used per se as an impact resistant thermoplastic, suitable as a molding powder or the preparation of films or sheets. The composite material can also be combined with additional amounts of a rigid thermoplastic, serving as a modifier of the impact properties. Whether used per se or in combination with other materials, the impact resistance is attained with low initial haze and resistance to haze increase upon water exposure.

The composite interpolymer material is ordinarily prepared by emulsion polymerization of the elastomer as a discrete phase from a monomer mix of at least about 50 weight percent alkyl and/or aralkyl acrylate, 0.05 to 5.0 weight percent of a poly-unsaturated cross-linking monomer, 0.05 to 5.0 weight percent of a graft-linking comonomer, and 0 to 10.0 weight percent of a hydrophilic comonomer. Upon completion of the polymerization of the elastomeric phase, i.e., substantial exhaustion of the monomers in the initial polymerization mix, the rigid thermoplastic is then formed by polymerization at the surface, as hereinafter defined, of the elastomer phase, in the same emulsion, of a monomer mix comprising at least about 50 weight percent $C_1$–$C_4$ alkyl methacrylate. The monomers which are polymerized to form the rigid themroplastic phase of the composite are added in such a fashion that substantially all the rigid phase material is formed on or at the surface of the elastomeric phase and has a minimum attachment level, as hereinafter defined, of about 20 percent.

In preferred formulations of the composite interpolymer, the elastomeric phase monomer mix contains about 0.1 to 1.0 weight percent of a cross-linking comonomer, 0.1 to 1.0 weight percent of a graft-linking comonomer, and 0.5 to 5.0 weight percent of a hydrophilic comonomer, together with at least 50 weight percent alkyl and/or aralkyl acrylate.

The acrylic elastomer phase of the composite interpolymers are copolymers containing major proportions of alkyl and aralkyl acrylates, with the inclusion of about 0.05 to 5.0 weight percent of a polyunsaturated cross-linking comonomer and from about 0 to 10.0 weight percent of a hydrophilic comonomer, ordinarily polymerized from an emulsion or suspension. The acrylic elastomer comprises at least 50 percent of alkyl and/or aralkyl acrylate units. The alkyl esters of acrylic acid have alkyl groups of one to fifteen carbon atoms, preferably 1 to 8 and most preferably 2 to 8 carbon atoms. Longer chain alkyl groups may be used. Other acrylic monomers, up to about 50 weight percent, less the other inclusions, can also be used, such as aralkyl esters of acrylic acid wherein the cyclic portion contains 5, 6 or 7 carbon atoms, with or without an additional alkyl bridge, and the alkyl portion of the aralkyl group containing up to 15 carbon atoms may also be used. Substituted acrylates or methacrylates including alkylthioalkyl acrylates such as ethylthioethyl acrylate, and the like, alkoxyalkyl acrylates, such as methoxyethyl acrylate, and the like can also be used. Interpolymers with these acrylates can be based on up to about 40 weight percent of one or more other addition polymerizable monomers such as styrene, α-methyl styrene, vinyl ethers, amides, and esters, vinyl and vinylidene halides, and the like.

The acrylic elastomers include polyfunctional unsaturated monomers capable of cross-linking the elastomer, such as polyethylenically unsaturated monomers like polyacrylates and polymethacrylates, and monomers capable of ionic and coordinate cross-linking such as acid groups and organic and inorganic bases and other electron donating groups co-ordinating with suitable electrophilic agents. The cross-linked elastomers are referred to as gelled interpolymers to describe that physical characteristic of the polymers. The polyethylenically unsaturated monomers include polyacrylic and polymethacrylic esters of polyols such as butylene diacrylate and dimethacrylate, trimethylolpropane trimethacrylate, and the like, di- and trivinyl benzene, vinyl acrylate and methacrylate and other cross-linking monomers.

Preferred are those elastomers which have a glass temperature less than 25° C. More preferred are those elastomers having a glass temperature less than 10° C., and most preferred are those elastomers having a glass temperature less than —25° C. In all cases, these glass temperatures refer to the elastomeric portion of the modifier only and do not include any subsequent phases or other polymers attached physically or chemically onto or into the particles of the elastomer.

The preferred elastomers of this invention include acrylic interpolymers comprising 50 to 80 parts by weight alkyl acrylate monomers, wherein the alkyl group contains 1 to 8 carbon atoms, 0 to 40 parts by weight of other ethylenically unsaturated monomers 0.05 to 5 parts by weight of at least one polyunsaturated cross-linking monomer, 0.05 to 5.0 parts by weight of graft-linking monomer, and 0 to 10.0 parts by weight of at least one hydrophilic monomer. Preferred are those acrylic elastomers wherein the interpolymer comprises 50 to 100 parts by weight alkyl acrylate monomers, wherein the alkyl group contains 1 to 8 carbon atoms, 1 to 20 parts by weight other acrylic monomers, 5 to 20 parts by weight other ethylenically unsaturated monomers, preferably those other ethylenically unsaturated units being aromatic, such as styrene and substituted styrene, 0.1 to 1.0 part by weight of at least one polyethylenically unsaturated cross-linking monomer unit, 0.1 to 1.0 part by weight of graft-linking monomer and 0.5 to 5.0 parts by weight of at least one hydrophilic monomer.

The inclusions of the cross-linking monomer, the graft-linking monomer and of the hydrophilic monomer in the acrylic elastomer lead to the substantial improvements in the properties herein before described, including reduction of the initiial haze level, in the amount and rate of increase of haze upon exposure to water or to weathering. It is not entirely clear how the improvement is attained, but it has been observed that the effects of each are at least cumulative. The inclusion of each of the noted monomers results in some improvement in the properties of the product, but none alone is able to attain the effectiveness of the combination.

The graft-linking monomers contemplated in the present invention are similar to the cross-linking monomers hereinbefore described, but where the cross-linking monomers, as that term is commonly employed, and as it is utilized herein, have a plurality of addition polymerizable unsaturated groups, each of which participate in the polymerization reaction at about the same rate as one another and as the primary monomers, i.e., the alkyl acrylate monomers, the other acrylic monomers, and the reactive other monomers, the graft-linking monomers in the present invention are compounds having two or more addition polymerizable unsaturated reactive groups which participate in the polymerization reaction at substantially different rates. It is preferred to include compounds where at least one reactive group polymerizes at about the same rate, or slightly slower than the other monomers, while the remaining reactive group or groups polymerize at a substantially different, i.e., slower, rate. The differential polymerization rates result in a residual level of unsaturation in the elastomeric phase, particularly during the latter stages of polymerization and, consequently, at or near the surface of the elastomer particles. When the rigid thermoplastic phase is subsequently polymerized at the surface of the elastomer, the residual unsaturated addition polymerizable reactive groups contributed by the graft-linking monomer participate in the subsequent reaction so that at least a portion of the rigid phase is chemically attached to the surface of the elastomer. The extent and nature of the attachment is hereinafter explained more fully.

The compounds particularly preferred for use as graft-linking monomers in the present invention are allyl methacrylate and allyl acrylate. Other compounds suitable for use as graft-linking monomers in the present invention include, by way of example, allyl, methallyl, and crotyl esters of acrylic acid, methacrylic acid, maleic acid (mono- and di-esters); fumaric acid (mono- and di-esters) and itaconic acid (mono- and di-esters); allyl, methallyl and crotyl vinyl ether; allyl, methallyl, and crotyl vinyl thioether; N-allyl, methallyl or crotyl maleimide; vinyl ester of 3-butenoic and 4-pentenoic acid, triallyl cyanurate; O-allyl, methallyl or crotyl O-alkyl, aryl, alkaryl or aralkyl P-vinyl, allyl, or methallyl phosphonate, triallyl, trimethallyl or tricrotyl phosphate; O-vinyl, O,O-diallyl, dimethallyl or dicrotyl phosphate cycloalkenyl esters of acrylic acid, methacrylic acid, maleic acid (mono- and di-esters), fumaric acid (mono- and di-esters), itaconic acid (mono- and di-esters), such as 2, 3, or 4 cyclohexenyl acrylate, bicyclo (2,2,1) hept-5-ene-2-yl esters of acrylic acid, methacrylic acid, maleic acid (mono- or di-esters), fumaric acid (mono- and di-esters) and itaconic acid (mono- and di-esters); vinyl ethers and vinyl thioethers of cycloalkenols and cycloalkene thiols such as vinyl cyclohex-4-ene-1-yl ether, vinyl ether of bicyclo (2,2,1) hept-5-ene-2-ol, vinyl esters of cycloalkene carboxylic acid or vinyl bicyclo (2,2,1) hept-5-ene-2-carboxylate.

Among the effective graft-linking monomers, allyl group containing compounds are preferred, particularly allyl esters of ethylenically unsaturated acids. Most preferred are allyl acrylate, allyl methacrylate, diallyl maleate, diallyl fumarate, diallyl itaconate, allyl acid maleate, allyl acid fumarate, and allyl acid itaconate. Another category of allyl compounds which are highly effective, but not so preferred as the foregoing materials, are the diallyl esters of polycarboxylic acids which do not contain polymerizable unsaturation. Where two or more allyl groups occur in a single compound, one will tend to polymerize with substantially greater ease than another.

The inclusion of the graft-linking monomer into the elastomer operates in a fashion which is incompletely understood. However, it is known that the inclusion of the graft-linking monomer operates in a fashion different from the inclusion of cross-linking monomer alone. The inclusion of cross-linking agents, such as butylene diacrylate, divinyl benzene, and the like, effectively cross-link the elastomer but do not provide significant graft-linking. To obtain the benefits of this invention it is necessary to provide graft-linking between the elastomer and hard phase and to effectively cross-link the elastomer. For example, the use of cross-linker alone provides little benefit in the reduction of haze level in the modified rigid thermoplastic polymers. The inclusion of both graft-linking and cross-linking monomers in the elastomers of this invention reduce haze level, either initially or upon prolonged exposure. It is hypothesized, that the graft-linking monomers affect the interface between the elastomer and the hard phase in such fashion that haze formation, possibly attributable to accumulation of water at the interfaces, is effectively eliminated in that no "microvoids" are able to form. This hypothesis remains unproven, however, and should not be considered binding. It has been observed that when the elastomer is polymerized without the graft-linking monomer so that the rigid thermoplastic phase is not attached on the surface of the elastomer particles as a last stage of the polymerization, or when no rigid phase is polymerized onto the elastomer, i.e., the elastomer and the rigid material are separately prepared and are later combined, the benefits of the present invention are not realized.

The mode of operation of the hydrophilic monomer, included in amounts ranging from about 0 to 10.0 parts per hundred parts of elastomer, is believed to be understood, but again the evidence is not so conclusive that it should be considered binding. It appears that the hydrophilic monomer serves, when polymerized in the elastomer, to bind whatever amounts of water are transmitted into the composition, in the manner of water of hydration, for example. Any monomer which can be polymerized in the elastomer mix and which is hydrophilic enough to effectively bind water is contemplated within the scope of the invention. Among the hydrophilic monomers which can be mentioned, by way of example only, are acrylonitrile, methacrylonitrile, hydroxy-substituted alkyl and aryl acrylates and methacrylates, amino-substituted alkyl and aryl acrylates and methacrylates, polyether acrylates and methacrylates, alkyl-phosphato-alkyl acrylates and methacrylates, alkyl-phosphonoalkyl acrylates and methacrylates, acrylic acid, methacrylic acid, maleic acid, maleic anhydride, N-vinyl pyrrolidone, alkyl and substituted alkyl amides of acrylic acid, methacrylic acid, maleic acid (mono- and di-amides) fumaric acid (mono- and di-amides) itaconic acid (mono- and di-amides), acrylamide, methacrylamide, and the like. Many others will occur to those skilled in the art, and the scope of the present invention should be interpreted to include such hydrophilic monomers generally. The proper scope of the invention should also be interpreted to include variations on the inclusion of the hydrophilic monomer, such as, for example, when a monomer is included in the polymerization mix which is not itself hydrophilic but is altered in processing or in a subsequent step, e.g. by hydrolysis or the like, to provide hydrophilicity.

Among the effective hydrophilic monomers, it is preferred to utilize methacrylic compounds, particularly the amides and hydroxy alkyl esters of methacrylic acid; amides and hydroxy alkyl esters of other acids are also preferred, but less so than the corresponding methacrylates, which are more readily polymerized.

Within the scope of the foregoing disclosure, it is readily apparent that many variations can be made in the preparation of the elastomeric phase of the composite interpolymer, and further that preferred variations of each constituent part are taught. While in its broadest terms, the elastomeric phase comprises a polymer of the alkyl acrylate, the cross-linking monomer, the graft-linking monomer, optionally the hydrophilic monomer, and a balance, optionally also, of other acrylic monomers and other non-acrylic monomers, it is possible to point to narrower ranges of components and proportions thereof which have been found to be particularly effective and/or convenient, either in preparation, handling, formulation, or use, and are accordingly preferred. For example, the formulations comprise elastomers polymerized from 50 to 99.9 weight percent alkyl acrylates, where the alkyl group contains 1–8 carbon atoms, 0 to 49.9 weight percent other acrylic monomers, 0 to 40 weight percent other ethylenically unsaturated monomers, 0.05 to 5.0 weight percent cross-linking monomer, 0.05 to 5.0 weight percent graft-linking monomer, and 0 to 10.0 weight percent hydrophilic monomer. In more preferred formulations, the elastomer will be polymerized from 50 to 80 weight percent of an alkyl acrylate, where the alkyl group contains 2 to 4 carbon atoms more preferably 4 carbon atoms, 0.1 to 10 weight percent other acrylic monomers, 0.1 to 1.0 weight percent cross-linking monomers, 0.1 to 1.0 weight percent graft-linking monomers, 0 to 5.0, more preferably 0.5 to 5.0, weight percent hydrophilic monomer, and the balance other non-acrylic unsaturated monomers, more preferably styrene, α-methyl styrene, and halostyrenes.

The rigid thermoplastic phase of the composite interpolymer of this invention include the class known in the art as acrylic polymers. In the invention, these polymers may be characterized as having the majority (e.g., 50–100%) of alkyl methacrylate units in the polymer. This entire class of acrylic polymers lacks a satisfactory resistance to impart. The acrylic thermoplastic polymers as a class and as used in this specification may be more narrowly considered durable acrylic interpolymers containing minor amounts (0 to 40 percent) of non-acrylic units and mixtures of all acrylic polymers with minor amounts of nonacrylic polymers to provide well-known balances of physical characteristics. Acrylic units are alkyl and aryl methacrylates and acrylates. As used in this specification the group alkyl also includes cycloalkyl, bridged and unbridged, while the group aryl also include aralkyl and alkaryl. All these groups may be substituted or unsubstituted. These acrylic polymers have a heat distortion temperature greater than about 20° C. preferably greater than 50° C., for most general purpose applications. The rigid thermoplastics of this invention include copolymers of 50 to 100 percent alkyl methacrylate, wherein the alkyl group contains 1 to 4, preferably 1, carbon atoms, containing one or more acrylic comonomers in quantities 0 to 50 percent such as other alkyl and aryl methacrylates, alkyl and aryl acrylates, alkyl and aryl acrylamides, substituted alkyl and aryl methacrylates and acrylates such as halogen, alkoxy, alkylthio, cyanoalkyl, amino, alkylthiol esters, and other substitutions, and 0 to 40 percent of other unsaturated monomers including acrylonitrile and methacrylonitrile, styrene monomers and substituted styrene monomers, vinyl esters, vinyl ethers, vinyl amides, vinyl ketones, vinyl halides, vinylidene halides, and olefins. Generally, as the comonomer system chosen is softer, less is used in order to retain the rigid characteristics desired.

Typical of the monomers which may be used to prepare the acrylic polymers include esters of acrylic and methacrylic acid such as methyl, ethyl, n-propyl, isopropyl, n-butyl, isobutyl, 2-ethylhexyl, stearyl, cyclohexyl, isobornyl, bornyl, fenchyl, norbornyl, adamantyl, benzyl, phenyl and the like. Preferred are those alkyl esters of methacrylic and acrylic acids wherein the alkyl group contains 1 to 4 carbon atoms. The preferred cycloalkyl esters of methacrylic and acrylic acids have cycloalkyl group containing 4 to 14 carbon atoms. The substituted esters of methacrylic acid and acrylic acid include chlorine and bromine substituted lower alkyl esters; alkoxy substituted lower alkyl esters such as ethoxy, methoxy; alkylthio substituted lower alkyl esters such as ethylthio and methylthio; cyanoalkyl substituted lower alkyl esters such as cyanoethyl and the like. Styrene monomers include halostyrenes, vinyl toluene, t-butyl styrene, α-methyl styrene, and the like. Vinyl halides and vinylidene halides wherein the halides include chloride, bromide, and fluoride; olefins include ethylene, propylene, isobutylene and the like, can also be utilized.

The composite acrylic interpolymers of the present invention are prepared by suspension or emulsion polymerization procedures utilizing a multi-stage, or sequential, technique. In simplest form the elastomeric phase is formed in a first stage and the rigid thermoplastic phase is formed in a second stage. Either the elastomeric or rigid phases can themselves also be sequentially polymerized. The monomers of the initial stage, together with initiators, soap or emulsifier, polymerization modifiers and chain transfer agents and the like are formed into the initial polymerization mix and polymerized, e.g., by heating and mixing the emulsion, in well-known and wholly conventional fashion, until the monomers are substantially depleted. Monomers of the second, and, in turn, of each additional, stage are then added with appropriate other materials, e.g., initiator, soap, and the like, so that the desired polymerization of each stage occurs in sequence to substantial exhaustion of the monomers. In each stage subsequent to the first, the amounts of initiator and soap, if any, are maintained at a level such that polymerization occurs at the surface of existing particles, and no substantial number of new particles, or "seeds" form in the emulsion. When the elastomeric phase of the composite interpolymer is itself formed by sequential polymerization, it is preferred to include the graft-linking monomer and the hydrophilic monomer in the last, or last few, stages of the elastomer. In the alternative, these components can be present throughout the entire elastomeric phase, included in each stage. The stages can vary in hardness, from a very soft elastomer first stage seed to the hardest rigid thermoplastic. Both the elastomer and the rigid thermoplastic can contain chain transfer agents, in one or all stages, and any or all of the stages of the composite can contain polyfunctional cross-linking monomers.

When polymerizations are conducted in multistage, sequential processes, there can additionally be stages which are, in composition and proportion, a combination of the two distinct phases, and having properties which are intermediate therebetween.

Polymerization is conducted in accordance with known techniques for effecting emulsion or suspension polymerization, with the use of conventional materials, including, for example, free-radical initiators, soaps and emulsifiers, modifiers of numerous types, and the like. Many of such materials are utilized commonly in the form of metal salts, particularly alkali metal salts. It has been noted that the utilization of potassium salts to the exclusion of sodium from the polymerization system provides certain advantages in many cases. Particularly in the cases where the rigid phase of the final product is to any significant extent acrylic, water exposure presents a reduced level of haze when the potassium salts are utilized. It appears that potassium salts are more completely removed if the resulting polymers are water washed, and the minor amounts which remain do not contribute the same effect as in the case of sodium.

The polymerization reactions can be initiated by either thermal or redox-type initiator systems. Examples of thermal initiators include the organo peroxides, such as benzoyl peroxide, substituted benzoyl peroxides, acetyl peroxides, lauroyl peroxide, t-butyl hydroperoxide, di-t-butyl hydroperoxide; peresters, such as t-butyl peroxypivulates; azo-type initiators, such as azo-bis-isobutyronitrile; persulfates, such as sodium, potassium, or ammonium persulfate; and peroxyphosphates, such as sodium, potassium, or ammonium peroxyphosphate. Redox initiators include, for example, a combination of a hydroperoxide, such as hydrogen peroxide, t-butyl hydroperoxide, cumene hydroperoxide, diisopropyl-benzene hydroperoxide, and the like, and a reducing agent, such as sodium, potassium or ammonium bisulfite, metabisulfite, or hydrosulfite, sulfur dioxide, hydrazine, ferrous salts, isoascorbic acid, sodium formaldehyde sulfoxalate, and the like.

Examples of emulsifiers or soaps suited to the polymerization processes of the present invention include alkali metal and ammonium salts of alkyl, aryl, alkaryl, and aralkyl sulfonates, sulfates, and polyether sulfates, ethoxylated fatty acids, esters, alcohols, amines, amides, alkyl phenols, complex organo-phosphoric acids and their alkali metal and ammonium salts.

Chain transfer agents, including mercaptans, polymercaptans, and polyhalogen compounds are often desirable in the polymerization mix.

Thus, the composite interpolymers of the present invention is comprised of two discrete component phases chemically linked together at the interface. Because of the extreme complexity of the interrelations among the various ingredients, it is difficult and possibly meaningless to refer to the physical characteristics of the component phases. Because of the degree of cross-linking in the elastomer phase and the participation of residual unsaturation of the elastomer in the polymerization of the rigid phase, no adequate or meaningful determination of molecular weight can be ascertained. A portion of the rigid phase is chemically bound to the elastomer; an additional portion is not. Extraction of the composite interpolymer permits determination that the unattached portion of the rigid phase has a measurable molecular weight, which varies with the amount of rigid phase and the nature of the polymerization procedure, and which can ordinarily vary from about 50,000 up to as much as 500,000 or even more. The elastomer portion has been ascertained to generally have a swelling ratio (weight of wet, acetone extracted, insoluble gel/weight of dry, acetone extracted gel) ranging from about 2 to 12, while the unextractable portion of the interpolymer as a whole has a swelling ratio on the order of about 6 to 16.

The relative proportions of the elastomeric and thermoplastic phases can vary quite widely. For example, when the composite interpolymer is intended for recovery from the polymerization and direct utilization, as for, example, a molding powder, it is, of course, necessary to include in the rigid phase polymerization stage or stages sufficient monomer to provide the total contemplated proportion of the rigid thermoplastic. In such cases, the elastomer will comprise only a minor amount of the final composite, e.g. as little as about 0.5 weight percent when only minor improvements in impact properties are required or desired. More often, however, larger proportions of the elastomer are contemplated, particularly when the composite interpolymer is intended to be an impact modifying additive to another material (i.e., a rigid acrylic thermoplastic of the same character as the rigid phase of the composite). In such cases, much less rigid phase need be polymerized onto or at the surface of the elastomer. As little as about 16 weight percent of the rigid phase can be sufficient, although it is ordinarily preferred that the rigid phase be more than about 20 weight percent, and still more preferably in excess of about 25 weight percent, of the total composite interpolymer.

The degree of attachment between the elastomer phase and the rigid phase is a function of a number of factors, primarily the degree of residual unsaturation in the graft-linking monomer at the "surface" of the elastomer phase when polymerization of the rigid phase commences. The important consideration in the degree of attachment between the phases is not the percentages of the total rigid phase which is attached to the elastomer. Rather, the relative proportions of attached rigid phase to the elastomer phase is significant. The amount of attached rigid phase material is herein considered to be the total rigid phase material in the composite interpolymer less the amount of extractable rigid phase material. The amount of extractable rigid phase material is determined by repeatedly extracting 0.5 g. of the composite interpolymer with 20 ml. increments of acetone, recovery of the acetone insolubles, and determination of the weight change. The attachment level is defined as $$\frac{\text{Amount of rigid phase attached}}{\text{Amount of elastomer}}$$

The minimum attachment level consistent with the desired objectives has been found to be about 0.20 or 20%, for convenience. Such levels of attachment are provided by the compositions prepared in accordance with the present invention. At attachment levels below about 20%, the advantages of the present invention diminish rapidly and below about 15%, such advantages are substantially lost. No ultimate upper limit has been found to exist, although at very high levels, such as in excess of about 500%, and particularly above about 1000%, flow properties of the composite, and even of blends of the composite with other materials, are detrimentally effected. The excessively stiff and viscous materials are difficult to form.

Reference has heretofore been made to the polymerization of the rigid phase at or onto the surface of the elastomeric phase. When such references occur herein, it should be understood that such terminology is adopted for purposes of convenience and is believed to be not entirely descriptive of the results attained. While the phenomena involved are not so clearly understood that the following considerations should be considered binding it does appear that the rigid phase monomers penetrate and swell the elastomeric phase particles to some extent and are polymerized in the interior thereof. Since such effects undesirably interfere with the impact properties, polymerization conditions are preferred which tend to minimize penetration. The more rapid the polymerization of the rigid phase monomers, the less time is available for penetration to occur. Accordingly, relatively large amounts of initiator, relatively high temperatures, and relatively slow additions of the rigid phase monomers are preferred to minimize penetration. Even when such preferred conditions are observed, some penetration will still occur, but will not be so large an element in determining the properties of the composite. It is theoretically desirable, as well, to insure that encapsulation of the elastomer phase by the rigid phase occurs; whether such an effect is in fact attained by observance of the preferred conditions has not been ascertained, but the conditions are not inconsistent with such a result, at least where relatively large proportions of the rigid phase are employed.

By control of the polymerization variables, it is possible to control the particle size of the elastomers in the fashion well-known to the art. The particle size is not of narrow significance to the present invention, and can range from as low as about 500 A., or even less, up to as a large as about 3000 A. or more. When particularly high impact properties are desired, it is preferable to utilize relatively large particles. In the manufacture of molded articles or rigid sheets of high impact strength, it is accordingly preferred that the particle size range from about 1300 to 2000 A. more preferably 1600 to 2000 A.

For the preparation of transparent compositions, it is important to match the refractive indices of the phases. Control of the refractive index of such polymers is accomplished by balancing the various proportions of the diverse monomers.

The composite interpolymer can also be utilized as an additive to other rigid thermoplastics, generally of the same chaarcter as the rigid phase of the composite, to modify the impact properties thereof. In such contexts, the composite has advantages over such procedures utilized in the prior art by virtue of the superior handling characteristics, processability, and dispersability properties imparted by the rigid phase. Severe difficulties arise when an elastomer additive is blended with a rigid thermoplastic because of the tack and cohesiveness of the elastomeric materials heretofore utilized. The composite interpolymer of the present invention is not tacky and the particles do not coalesce at ordinary handling conditions. Thus, the composite interpolymer of the present invention can be considered analogous to a "master-batch" of the elastomer in at least some senses in which that term is commonly utilized.

Since it is the elastomeric phase of the composite interpolymer which imparts impact resistance, the composite is added to a rigid thermoplastic in such proportions that an appropriate proportion of the elastomer is provided, in accordance with the proportions disclosed and the rigid phase of the composite should be considered as a part of the total rigid phase for purposes of determining proportions of such blends.

The amount of elastomer in the blends of the composite interpolymer and a rigid thermoplastic varies greatly depending upon the type of elastomer, the type of rigid thermoplastic polymer, and the physical characteristics desired in the final product. It is generally desirable to include at least 0.5 weight percent elastomer in a molding composition to provide significant and commercially important improvements in the processing and physical characteristics. As the elastomer concentration is increased past 50 weight percent, certain physical characteristics of the combination are adversely affected and the compositions may no longer be considered. The physical characteristics adversely affected at the high elastomer concentration include modulus, turbidity, hardness, and shrinkage at high service temperatures. Preferably, the elastomer content ranges from 5 to 50 percent by weight of the molding composition, and more preferably is present in the range of 15 to 40 percent by weight most preferably 25 to 35 weight percent of the blend.

The blend of the composite interpolymer and the rigid thermoplastic can be accomplished by any known method. The rigid thermoplastic and composite can be prepared by suspending the composite in the monomer mix used to prepare the rigid thermoplastic or in a monomer-polymer syrup mix which together will yield the desired rigid acrylic thermoplastic polymer. The composite can be placed in the casting mix in the form of an emulsion, suspension, or dispersion in water or an organic compound. The water or organic compound can be removed before or after casting into the rigid thermoplastic. The composite rigid thermoplastic blend can be milled to form a well dispersed mixture in an extruder, a roll mill or like equipment to prepare a molding composition. The composite and the rigid thermoplastic can be blended together while both are in emulsion, suspension or solution in an aqueous or non-aqueous system, the particles being isolated from the water or organic compound by coagulation, spray drying or known means of isolation, and are further processed with or without an intermediate drying step. Another convenient method of blending the composite and the rigid thermoplastic is by suspending the relatively dry coagulated or spray dried composite interpolymer in the unpolymerized monomer mix for the rigid thermoplastic and polymerizing the monomer to form the rigid thermoplastic with the elastomer intermixed therein. The bulk casting is then granulated and processed in an extruder, mill, or injection molding equipment. The blended compositions of this invention can also be prepared by merely mixing emulsions or suspensions of the acrylic thermoplastic polymer and with the composite latex, which may be accomplished by preparing the composite in emulsion or suspension. Additional emulsifiers or suspending agents can be added to generate new particles. The monomer system used to prepare the rigid thermoplastic polymer is then added directly to the suspension and polymerized. Thus the composite interpolymer modifier and the rigid thermoplastic polymer are prepared in the same emulsion or suspension and can be washed, isolated and processed directly as a one pot molding composition.

When the composite interpolymer is blended with a separate rigid thermoplastic, the materials where the greatest benefits are derived include the rigid acrylic thermoplastics and the rigid vinyl halide thermoplastics.

The rigid acrylic thermoplastic suited for blending with the composite interpolymer of this invention include the class commonly known in the art as rigid acrylic polymers. As in the rigid phase of the composite, these polymers may be characterized as having the majority (e.g., 50–100%) of alkyl methacrylate, preferably methyl methacrylate, units in the polymer. This entire class of rigid acrylic polymers lacks a satisfactory resistance to impact. The acrylic thermoplastic polymers as a class are generally durable acrylic interpolymers containing minor amounts (0 to 10 percent) of non-acrylic units and mixtures of all acrylic polymers with minor amounts of nonacrylic polymers to provide well-known balances of physical characteristics. Acrylic units are alkyl and aryl methacrylates and acrylates. As used in this specification the group alkyl also includes cycloalkyl, bridged and unbridged, while the group aryl also include aralkyl and alkaryl. All these groups may be substituted or unsubstituted. These acrylic polymers have a heat distortion temperature greater than about 20° C. preferably greater than 50° C., for most general purpose applications. The rigid thermoplastics of this invention include copolymers of 50 to 100 percent alkyl, preferably methyl, methacrylate containing one or more comonomers in quantities 0 to 50 percent such as other alkyl and aryl methacrylates, alkyl and aryl acrylates, alkyl and aryl acrylamides, substituted alkyl and aryl methacrylates and acrylates such as halogen, alkoxy, alkylthio, cyanoalkyl, amino, alkylthiol esters, and other substitutions, and 0 to 10 percent of other unsaturated monomers including acrylonitrile and methacrylonitrile, styrene monomers and substituted styrene monomers, vinyl esters, vinyl ethers, vinyl amides, vinyl ketones, vinyl halides, vinylidene halides, and olefins. Generally, as the comonomer system chosen is softer, less is used in order to retain the rigid characteristics desired.

Polyvinyl halide rigid thermoplastics include, but are not limited to, polyvinyl chloride, copolymers of vinyl chloride, polyvinyl chloride polymers with modifying compounds, halogenated polyvinyl chloride, and plasticized vinyl chloride compositions. The inclusion of the composites in polyvinyl halide compositions yields many advantages including greatly increased and non-laminar flow at melt temperatures, that is, processing and extruding temperatures and reduced die swell, without significantly affecting the physical characteristics at normal service temperatures, improved impact strength or tensile properties in rigid extruded polyvinyl chloride sheet compositions, improved mechanical properties in plasticized vinyl compositions, excellent die swell properties on extrusion and good weathering properties. The molecular weight and molecular weight distribution of the polymers in the PVC compositions is not critical to the aims, purposes and results of using this invention. For general applications PVC with Fikentscher K-values in the range of 40 to 95' are generally used. The Fikentscher K-value is determined by the formula $$\frac{\text{Log } \eta_{rel}}{C} = \frac{75 \times 10^{-6} K^2}{1 + 1.5 \times 10^{-3} KC} + 10^{-3} K$$

where:

C is a constant concentration of polyester in solvent equating 0.5 gm./100 ml.
$\eta_{rel}$ is relative viscosity in cyclohexanone at 25° C. and K is Fikentscher value.

Irrespective of whether the composite interpolymer of the present invention is utilized per se or as an additive to a rigid thermoplastic, it can be formed, by appropriate techniques, into excellent quality, exceptionally high impact resistant finished products having low initial haze levels and with reduced susceptibility to weathering phenomena, and particularly to haze level increase upon prolonged exposure to water. The materials provided in accordance with the present invention form high quality free films, rigid sheet, and molded or extruded articles. Particular areas where the combination of advantageous features makes the materials of the invention particularly useful are those where the environment of use requires both impact resistance and good weathering properties, and where water exposure is an incident of use. Examples of such are virtually all outdoor applications, such as lighting fixtures, signs and displays, and the like.

It is normal practice to include in such compositions compounds and materials which stabilize the products and inhibit oxidative, thermal, and ultra-violet light degradation. Such practices are contemplated within the scope of the present invention, and appropriate stabilizers are ordinarily incorporated into the composite interpolymer and into blends of the composite interpolymer with other materials. Stabilizers can be included at any stage from the polymerization process whereby the composite and/or the materials with which the composite is blended are formed, to the final step of forming the final product. It is preferred that stabilizers be included early in the life of such polymers to preclude the initiation of degradation before the material can be protected. Accordingly, the preferred practice is to include stabilizers in the polymerization process, if compatible therewith, or in the polymer latex resulting from the polymerization.

The oxidative and thermal stabilizers useful in the materials of the present invention include those used in addition polymers generally. They include, for example, hindered phenols, hydroquinones, phosphites, and varieties of substituted members of those groups and combinations thereof.

The ultra violet light stabilizers can also be those used in addition polymers generally. Examples of ultra violet light stabilizers include various substituted resorcinols, salicylates, benzotriazoles, benzophenones, and the like.

Other inclusions in the materials of the present invention include lubricants, such as stearic acid, stearic alcohol, eicosanol, and other known types; colorants, including organic dyes, such as anthraquinone Red and the like, organic pigments and lakes, such as phthalocyanine Blue and the like, and inorganic pigments, such as titanium dioxide, cadmium sulfide, and the like; fillers and particulate extenders, such as carbon black, amorphous silica, asbestos, glass fibers, magnesium carbonate, and the like; plasticizers, such as dioctyl phthalate, dibenzyl phthalate, butyl benzyl phthalate, hydrocarbon oils, and the like.

While only a few of such materials have been specifically recited, it is not intended to exclude others; the recitation is exemplary only, and each category of additive is common and well-known in the art, including extremely large numbers of materials which are equally well suited for inclusion in the materials of the present invention.

Such inclusions in the materials of the present invention can be made at any stage of preparation, in accordance with techniques well-known to those of ordinary skill in the art, in proportions which are commonly employed. Such additional materials are not of particular significance in the present invention and form no part thereof.

To assist those skilled in the art in the practice of the present invention, the following modes of operation are set forth as illustrations, parts and percentages being by weight unless otherwise specifically noted:

EXAMPLE I

A series of elastomer compositions are prepared to illustrate the effect of the present invention in producing haze resistant high impact rigid thermoplastics. The compositions are varied to show the effect of (1) the inclusion of a graft-linking monomer in the elastomer polymerization mix; and (2) the presence of hydrophilic comonomers in the elastomer.

The elastomer compositions are prepared in accordance with the following procedure:

The elastomer monomer charge is emulsified, using an alkali metal salt of dodecylbenzene sulfonic acid as the emulsifier. About 20 percent of the monomer charge is polymerized with an alkali metal persulfate at elevated temperature to form a "seed." The remainder of the elastomer monomer charge. with the further inclusion of other monomers, as appropriate, is then added and polymerized, substantially to completion, while controlling the soap or emulsifier concentration to prevent the formation of a significant number of new particles. The resultant polymer is retained in emulsion form and an increment of appropriate monomers are polymerized onto the particles to form a subsequent stage of a rigid thermoplastic. The composite interpolymer (representing the sequentially polymerized elastomer and rigid thermoplastic) is isolated from the emulsion by evaporation and dried under reduced pressure. The seed technique affords effective control of the particle size, but, of course, is necessary only to the preparation of relatively large size particles. For small particle sizes, a single stage polymerization of the elastomer can be utilized.

The composite is blended with an appropiate rigid thermoplastic on a roll mill to give a 30 percent by weight concentration of elastomer and the blend is compression molded into a slab. The Izod notched impact strength and initial haze are determined, and the slab is then subjected to 100 percent relative humidity at 50° C., for an appropriate length of time, when the haze level is again determined.

Six different compositions are prepared and tested in accordance with the above procedure, and the results are reported in Table I. The elastomers in the example all comprise a major amount of butyl acrylate, a minor, but still substantial proportion of styrene, and a minor amount of 1,3-butylene diacrylate. In Table I, these are designed for convenience, respectively, BA, S, and BDA. Other inclusions, and their respective abbreviations appearing in the table, are allyl methacrylate (ALMA), acrylonitrile (AN), hydroxyethyl acrylate (HEA), methacrylamide (MAM), methyl methacrylate (MMA), and ethyl acrylate (EA). Another matter of convenience in the table is in the representation of the percentages of the components in the elastomer. The base components, i.e., BA, S, hydrophilic monomer, and MMA total 100 parts by weight, and other inclusions are reported as a percentage by weight based on the foregoing components. In this manner, changes of composition are readily observed. In addition, a convenient "short hand" representation of composition and proportions is utilized. All the components of each phase are represented in the heading of the tabulation, separated by a single slash; components of different phases are separated by a double slash. All the modifier compositions are prepared by the seed technique, and only BA, S, and BDA are included in the initial, seed forming emulsion. Other components of the elastomer are included in the second stage of the polymerization, and conditions are manipulated so that an average particle size of about 1900 A. is attained.

TABLE I

| | Composition of composite interpolymer | | | | | | Rigid thermoplastic | | Haze, percent, ASTM D-1003-61 | | | | | | 1/8" Izod impact (ft.-lbs./in. of notch) ASTM D-256-56(A) |
|---|---|---|---|---|---|---|---|---|---|---|---|---|---|---|---|
| | | | | | | | | | | | 100% RH/50° C. | | | | |
| Run | BA | S | BDA | ALMA | X | MMA [1] | MMA/EA | $M_v$ $\times 10^{-3}$ * | Initial | 24 hrs. | 28 hrs. | 72 hrs. | 120 hrs. | |
| 1 | 57.4 | 12.6 | 0.35 | | | 30 | 96/4 | 140 | 10.0 | 31.6 | | 48.6 | | 1.1 |
| 2 | 57.4 | 12.6 | 0.35 | 0.3 | | 30 | 96/4 | 140 | 4.5 | 8.7 | | 13.8 | | 0.7 |
| 3 | 54.6 | 11.9 | 0.35 | | 3.5 AN | 30 | 96/4 | 210 | 5.9 | 5.9 | 8.0 | | 17.9 | |
| 4 | 52.5 | 10.5 | 0.35 | | 7.0 AN | 30 | 96/4 | 210 | 4.9 | 5.7 | 8.3 | | 21.7 | |
| 5 | 56.4 | 12.6 | 0.35 | 0.3 | 1.0 HEA | 30 | 96/4 | 210 | 8.2 | 8.2 | 9.2 | 10.2 | | 1.3 |
| 6 | 56.7 | 12.6 | 0.35 | 0.14 | 0.7 MAM | 30 | 96/4 | 165 | 5.0 | | 4.5 | | 5.6 | 1.4 |

[1] X represents a hydrophilic monomer, as designated.
* $M_v$ represents molecular weight as determined by solution viscosity.

Table I illustrates quite clearly the beneficial effect of the utilization of the graft-linking monomer and the hydrophilic monomer in accordance with the present invention. Run 1, where neither a graft-linking monomer nor a hydrophilic monomer is included in the elastomeric phase, has rather poor haze properties, as is common in the prior art. Run 2 shows the substantial improvement attained when a graft-linking monomer is added to the formulation. Runs 3 and 4 show the contribution of hydrophilic monomers to the composition. The results of combining both features is illustrated in Run 5 and Run 6, and the excellent improvements there show the great improvement attained in the practice of the present invention.

It can be noted that the rigid phase thermoplastic which is combined with the composite interpolymer varies in molecular weight from run to run, but such variation does not preclude direct comparison of the results, since the properties under consideration do not vary substantially within the range of molecular weights employed.

EXAMPLE II

A series of additional elastomer compositions are prepared to illustrate the use of other hydrophilic monomers, and the advantages which accrue from the inclusion of a hydrophilic monomer in that portion, if any, of the rigid thermoplastic polymerized onto the elastomer particles. The procedure of Example I is utilized, to provide a composite having an average particle size of about 1900 A., and the same rigid thermoplastic is utilized in each case. The results are reported in Table II. Notations appearing in Table II are the same as those in Table I, and the following additional materials are included: hydroxyethylmethacrylate (HEMA) and acrylamide (AM).

The sequential polymerization of Example I is conducted so that the "seed" comprised a portion of all the monomers of the elastomer phase, including the butyl acrylate, styrene, and butylene diacrylate, allyl methacrylate, hydroxypropyl methacrylate, and ethylthioethyl methacrylate. The balance of these were added to the base emulsion in a second stage. The methyl methacrylate and the methyl acrylate were added after the polymerization of the other monomers was substantially complete to provide an attached subsequent stage of a rigid thermoplastic. The latex resulting from the polymerization was spray dried to recover the solid particulate composite interpolymer, having an average particle size of about 2200 A.

The composite was then incorporated into three rigid acrylic thermoplastics in amounts sufficient to provide loadings of 20 and 30 weight percent elastomer. The methyl methacrylate-methyl acrylate stage is not a part of the elastomer, but rather is calculated as a portion of the rigid thermoplastic.) The blend of the rigid phases and the composite interpolymer were then extensively tested to ascertain the physical properties. The results of the testing are reported in Table IV, together with the corresponding values for the unmodified rigid thermoplastics. The three rigid thermoplastics, designated A, B and C in Table IV had the following compositions and properties:

(A) 95.6 wt. percent methyl methacrylate, 4.4 wt. percent ethyl acrylate, transparent, colorless, $M_v$=110,000.

(B) 99.0 wt. percent methyl methacrylate, 1.0% ethyl acrylate, transparent, colorless, $M_v$=110,000.

(C) 96.5 wt. percent methyl methacrylate, 3.5 wt. percent ethyl acrylate, transparent, colorless, $M_v$=155,000.

TABLE II

| Run | Composition of composite interpolymer, BA/S/BDA/ALMA/X//MMA/X [1] | Rigid thermoplastic MMA/EA | $\overline{M}_v \times 10^{-3}$ [*] | Haze, percent [2] Initial | 100% RH: 50° C. 24 hrs. | 48 hrs. | 72 hrs. | 120 hrs. | ⅛" Izod impact ft.-lbs./in. of notch [2] |
|---|---|---|---|---|---|---|---|---|---|
| 1 | 56.4/12.6/0.35/0.30/1.0 HEA//30/— | 96/4 | 210 | 8.2 | 8.2 | 9.2 | 10.2 | | 1.3 |
| 2 | 57.4/12.6/0.35/0.30/—//30/2.5 HEMA | 96/4 | 210 | 8.2 | 8.8 | 11.0 | 10.7 | | 1.4 |
| 3 | 56.4/12.6/0.35/0.30/1.0 HEMA//30/— | 96/4 | 210 | 6.9 | 7.5 | 8.4 | 8.4 | 10.1 | 1.4 |
| 4 | 56.4/12.6/0.35/0.30/1.0 HEMA//29/1.0 HEMA | 96/4 | 210 | 3.2 | 2.9 | 4.1 | | 4.8 | 1.0 |
| 5 | 56.7/12.6/0.35/0.28/0.70 AM//29/1.0 HEMA | 96/4 | 210 | 6.6 | 5.1 | 5.8 | | 7.1 | 1.8 |

[1] X represents a hydrophilic monomer, as designated.
[*] See footnote bottom of Table I.

EXAMPLE III

The following additional runs are made to show the effect of still other hydrophilic monomers. Methacrylamide (MAM), N-isopropyl acrylamide (NIPAM), and hydroxypropyl methacrylate (HPMA) are utilized.

In Table IV, the abbreviation TWLT refers to the ASTM designation for total white light transmittance, and tensile elongation at break refers to the microtensile values,

TABLE III

| Run | Composition of composite interpolymer, BA/S/BDA/ALMA/X//MMA [1] | Rigid thermoplastic MMA/EA | $\overline{M}_v \times 10^{-3}$ [2] | Haze, percent [2] Initial | 24 hrs. | 48 hrs. | 72 hrs. | 120 hrs. | ⅛" Izod std. impact ft.-lbs./in. of notch [2] |
|---|---|---|---|---|---|---|---|---|---|
| 1 | 56.7/12.6/0.35/0.14/0.7 MAM//30 | 96/4 | 210 | 2.9 | | 3.5 | | | 1.6 |
| 2 | 56.7/12.6/0.35/0.14/0.7 NIPAM//30 | 96/4 | 210 | 2.8 | | 4.0 | | | 1.2 |
| 3 | 56.4/12.6/0.35/0.14/1.0 HPMA//30 | 96/4 | 210 | 7.3 | | 8.0 | | | 1.5 |

[1] X represents a hydrophilic monomer, as designated.
[2] See footnote bottom of Table I.

EXAMPLE IV

A composite interpolymer is prepared by the procedure of Example I, having the following composition:

| | |
|---|---|
| Butyl acrylate | 55.7 |
| Styrene | 12.8 |
| Butylene diacrylate | 0.35 |
| Allyl methacrylate | 0.14 |
| Hydroxypropyl methacrylate | 1.0 |
| Ehtylthioethyl methacrylate | 0.5 |
| Methyl methacrylate | 28.5 |
| Methyl acrylate | 1.5 |

ASTM D-228-69, Type L bar at 0.03 inch/minute. The abbreviation VHT Impact refers to the variable high impact tensile values obtained on the tester supplied in commerce by Gardner Laboratories, Bethesda, Maryland. In this test, a steel slug weighing two or four pounds is dropped from varying heights to a dart with a 3/16 inch radius point in contact with the sample. The force, measured in inch-pounds, is reported at which 50% breakage is obtained. The other tests are standard ASTM procedures.

TABLE IV

| Acrylic thermoplastic | A | B | C | Run 1 A | Run 2 B | Run 3 C | Run 4 A | Run 5 B | Run 6 C |
|---|---|---|---|---|---|---|---|---|---|
| EA level, percent acrylic thermoplastic | 4.4 | 1.0 | 3.5 | 4.4 | 1.0 | 3.5 | 4.4 | 1.0 | 3.5 |
| Rubber level, percent | | | | 30 | 30 | 30 | 20 | 20 | 20 |
| Izod impact at 23° C. (ft./lbs./inch): | | | | | | | | | |
| ⅛″ milled notch | 0.32 | 0.36 | 0.31 | 1.3 | 1.6 | 1.9 | 0.8 | 1.0 | 1.0 |
| Do | 0.22 | 0.33 | 0.26 | 1.1 | 1.0 | 2.3 | 0.9 | 0.9 | 0.9 |
| Tensile impact (ft./lbs./inch²) at 23° C | 31.5 | 31.7 | 26.7 | 56.0 | 53.3 | 68.0 | 35.1 | 41.4 | 51.2 |
| VHIT impact (in.-lbs.) at— | | | | | | | | | |
| 23° C | 2.5 | 2.5 | 2.5 | 60 | 61 | 102 | 33 | 33 | 40 |
| 0° C | | | | 55 | 53 | 84 | 15 | 20 | 30 |
| Tensile properties: | | | | | | | | | |
| Percent elongation at break | 3.89 | 7.82 | 8.3 | 69 | 61 | 87 | 42 | 32 | 48 |
| Max. stress, p.s.i | 9,781 | 9,936 | 8,874 | 5,310 | 5,490 | 5,310 | 6,630 | 6,850 | 6,600 |
| Mod. (p.s.i. ×10⁻⁵) | 4.49 | 4.49 | 4.38 | 2.31 | 2.33 | 2.35 | 2.84 | 2.90 | 2.92 |
| Flexural properties: | | | | | | | | | |
| Maximum stress, p.s.i | 11,849 | 14,410 | 13,155 | 7,500 | 7,800 | 7,900 | 9,900 | 10,200 | 10,200 |
| Modulus (p.s.i. ×10⁻⁵) | 4.52 | 4.47 | 4.64 | 2.37 | 2.41 | 2.35 | 2.95 | 3.08 | 3.03 |
| HDT (264 p.s.i.), ° C | 82 | 81 | 86 | 73 | 79 | 79 | 80 | 83 | 80 |
| Vicat S.T., ° C | 99 | 96 | 97 | 95 | 100 | 97 | 99 | 104 | 99 |
| Optical properties initially: | | | | | | | | | |
| TWLT, percent | 92.0 | 91.9 | 92.0 | 86.1 | 86.0 | 87.8 | 87.9 | 87.2 | 87.8 |
| Haze, percent | 2.0 | 2.3 | 1.8 | 5.5 | 6.5 | 4.8 | 3.4 | 4.0 | 4.1 |
| After 48 hrs. at 100% R.H. and 50° C.: | | | | | | | | | |
| TWLT, percent | 92.1 | 91.7 | 91.8 | 83.0 | 82.1 | 85.5 | 85.5 | 83.9 | 85.6 |
| Haze, percent | 1.6 | 1.7 | 1.4 | 7.1 | 8.2 | 7.3 | 5.4 | 6.2 | 6.1 |
| After 72 hrs. recovery R.T.: | | | | | | | | | |
| TWLT, percent | 92.2 | 91.9 | 91.7 | 85.4 | 84.8 | 87.3 | 87.4 | 85.8 | 87.1 |
| Haze, percent | 1.8 | 1.8 | 1.5 | 7.5 | 8.4 | 8.1 | 4.8 | 6.1 | 6.4 |

EXAMPLE V

A composite interpolymer in accordance with the present invention is formed as follows:

A first stage elastomeric polymer is prepared from an emulsion of the following monomers in the proportions by weight as designated:

| | |
|---|---|
| Butyl acrylate | 55.70 |
| Styrene | 12.80 |
| Butylene diacrylate | 0.35 |
| Allyl methacrylate | 0.14 |
| Hydroxypropyl methacrylate | 1.00 |
| Ethylthioethyl methacrylate | 0.50 |

Upon substantial exhaustion of the monomers of the first stage polymerization, a second, rigid stage is prepared by polymerization on the surface of the first stage of the following monomers, in the designated proportions by weight:

| | |
|---|---|
| Methyl methacrylate | 28.5 |
| Methyl acrylate | 1.5 |

The composite interpolymer latex is added directly to molten rigid thermoplastic A of Table IV, to provide a blend containing 30% elastomeric phase, in a starved-screw devolatilizing extruder maintained at an elevated pressure. Water is removed in the liquid phase from the blend. A minor amount of residual water and unpolymerized monomers are vented under reduced pressure in the barrel of the extruder. The blend is extruded and chopped to provide a granular molding power, a portion of which is then formed into slabs having the properties designated in Table V.

TABLE V

| | Rigid thermoplastic | Blend |
|---|---|---|
| Izod impact (ft.lb./in.), 23° C.: | | |
| ¼″ milled notch | 0.32 | 1.8 |
| Do | 0.22 | 1.6 |
| Tensile impact (ft. lbs./in.³, 23° C | 31.5 | 56.0 |
| Tensile properties: | | |
| Percent elongation at break | 3.9 | 40–50 |
| Max. Stress, p.s.i | 9,780 | 4,850 |
| Modulus, (p.s.i. ×10⁻⁵) | 4.49 | 2.12 |
| Flexural Properties: | | |
| Max. stress, p.s.i | 11,850 | 7,250 |
| Modulus, (p.s.i. ×10⁻⁵) | 4.52 | 2.27 |
| HDT (264 p.s.i.), ° C | 82 | 71 |
| Optical Properties: | | |
| TWLT | 92.0 | 90.0 |
| Haze, percent | 2.5 | 4.0 |

An additional increment of the molding powder of the present example was extruded and blown to form a 10 mil free film having the following properties:

| Tensile properties: | |
|---|---|
| Break strain, percent | 30 |
| Break stress, 10³ p.s.i. | 4.8 |
| Elastic modulus, 10⁵ p.s.i. | 2.4 |
| Work to rupture, 10³ in.-lb./in.³ | 1.5 |
| Fold endurance: Cycles to fail, ×10³ | 0.4 |
| Brittleness temperature, ° C. | −1 |
| Haze, percent: | |
| Initial | 4 |
| 7 days water immersion, 43° C. | 4 |
| 16 hrs. recovery, ambient cond. | 4 |

EXAMPLE VI

A composite interpolymer is prepared in accordance with the present invention by the procedure followed in Example V, except that the second, rigid stage is polymerized from sufficient of the monomers therein specified so that the composite interpolymer contains 30 percent elastomeric phase. The resultant latex is fed under pressure to the starved-screw extruder utilized in Example V and the aqueous medium is removed in the liquid phase at elevated pressure. The resultant molding powder does not differ markedly in properties, when molded or extruded into a final product, from the product of Example V.

EXAMPLE VII

The composite interpolymer latex of Example V is combined with a molten rigid thermoplastic, utilizing the same procedure as Example V. In the present example, the rigid thermoplastic comprises 62% methyl methacrylate, 20% butyl acrylate, 12% ethyl acrylate, and 6% isobornyl methacrylate, and has a molecular weight of about 165,000. The resultant molding powder had substantially improved impact characteristics, low initial haze, and low susceptibility to haze increase upon exposure to water.

EXAMPLE VIII

A composite interpolymer in accordance with the present invention is prepared in a three stage formulation wherein the second stage has properties intermediate to and between the characteristics of the elastomer phase and the rigid phase. The monomers utilized in the preparation of the composite are, by stages as follows:

First stage:
| | |
|---|---|
| Butyl acrylate | 31.4 |
| Styrene | 4.5 |
| Ethylthioethyl methacrylate | 0.5 |
| Butylene diacrylate | 0.18 |
| Allyl methacrylate | 0.07 |

Second stage:
| | |
|---|---|
| Styrene | 28.6 |
| Butyl acrylate | 5.0 |
| Divinylbenzene | 0.3 |
| Allyl methacrylate | 0.07 |

Third stage:
| | |
|---|---|
| Methyl methacrylate | 18.0 |
| Styrene | 10.5 |
| Methyl acrylate | 1.5 |

The first stage monomer charge is formed into an aqueous emulsion utilizing the potassium salts of dodecylbenzene sulfonic acid as the emulsifier and is polymerized using the redox initiator pair diisopropylbenzene monohydroperoxide-sodium formaldehyde sulfoxalate to obtain a latex of polastomer particles having an average particle size of about 1,300 A. The second stage monomers are then added, adjusting the emulsifier concentration to maintain the dispersion of the materials, but presenting the formation of a significant number of new particles. The second stage monomers are then polymerized, substantially to completion with the same redox initiator pair. Finally, the third stage monomers are added to the polymer emulsion, with appropriate adjustment of the emulsifier and initiator components, and polymerized to form the third, rigid thermoplastic phase. The resulting latex of the three stage polymerization is spray dried to recover the solid particulate composite interpolymer which is found to have an average particle size of about 1600 A.

The composite interpolymer is incorporated into a rigid acrylic-styrene thermoplastic copolymer (MMA/S=65/35), having a molecular weight of about 120,000, in an amount sufficient to provide a loading of 15% elastomer, where in the second and third stages of the composite are considered to be a portion of the rigid thermoplastic material. The result of the blend is then extensively tested to ascertain the physical properties. The results of the testing are recorded in Table VI together with the corresponding values for the unmodified arylic-styrene rigid thermoplastic.

TABLE VI

| | Rigid thermoplastic | Blend |
|---|---|---|
| Izod impact (ft. lbs./in.), 23° C.: | | |
| ¼″ milled notch | 0.40 | 1.0 |
| Do | 0.30 | 0.8 |
| Tensile impact (ft. lbs./in.³), 23° C | 35.0 | 48.0 |
| Tensile properties: | | |
| Percent elongation at break | 4.5 | 5.5 |
| Maximum stress, p.s.i | 10,000 | 5,100 |
| Modulus, p.s.i. ×10⁻⁵ | 4.6 | 2.31 |
| Flexural properties: | | |
| Maximum stress, p.s.i | 12,250 | 7,500 |
| Modulus, p.s.i. ×10⁻⁵ | 4.30 | 2.17 |
| HDT (264 p.s.i.), ° C | 85 | 78 |
| Optical properties: | | |
| TWLT, percent | 90 | 89 |
| Haze, percent | 3.0 | 5.0 |
| After 48 hrs. at 100% R.H. and 50° C.: | | |
| TWLT, percent | 90.2 | 87 |
| Haze, percent | 3.1 | 6.0 |
| After 72 hrs. recovery R.T.: | | |
| TWLT, percent | 90.1 | 88 |
| Haze, percent | 2.9 | 5.4 |

EXAMPLE IX

A three stage composite interpolymer similar to that of Example VIII, and formed in the same polymerization technique but retained in emulsion form upon the completion of the processing, was formed from the following monomer components:

First stage:
| | |
|---|---|
| Butyl acrylate | 35.6 |
| Styrene | 4.5 |
| Ethylthioethyl methacrylate | 0.5 |
| Butylene diacrylate | 0.2 |
| Allyl methacrylate | 0.08 |

Second stage:
| | |
|---|---|
| Styrene | 24.4 |
| Butyl acrylate | 5.0 |
| Divinylbenzene | 0.3 |
| Allyl methacrylate | 0.06 |

Third stage:
| | |
|---|---|
| Methyl methacrylate | 21.0 |
| Alpha-methylstyrene | 7.5 |
| Methyl acrylate | 1.5 |

The composite interpolymer latex is added directly to a molten rigid plastic polymer of the following monomer components:

| | |
|---|---|
| Methyl methacrylate | 73.0 |
| Alpha-methylstyrene | 24.0 |
| Ethyl acrylate | 2.0 |
| Ethylthioethyl methacrylate | 1.0 |

The latex was added to provide a blend containing 17% elastomeric phase, in a starved-screw devolatilizing extruder maintained at elevated pressure. The water of the system is removed in the liquid phase from the blend. Minor amounts of residual water and unpolymerized monomers are vented under reduced pressure in the barrel of the extruder. The blend is extruded and chopped to provide a granular molding powder, a portion of which is then compression molded into slabs having the properties designated in Table VII, together with the comparable properties of the unmodified, reduced thermoplastic phase.

TABLE VII

| | Rigid thermoplastic | Blend |
|---|---|---|
| Izod impact (ft. lbs./in.), 23° C.: | | |
| ¼″ milled notch | 0.30 | 1.0 |
| Do | 0.25 | 0.9 |
| Tensile impact (ft. lbs./in.³), 23° C | 30 | 45 |
| Tensile properties: | | |
| Percent elongation at break | 2.5 | 4.0 |
| Maximum stress, p.s.i | 10,000 | 5,200 |
| Modulus, p.s.i. ×10⁻⁵ | 4.65 | 2.29 |
| Flexural properties: | | |
| Maximum stress, p.s.i | 12,000 | 7,400 |
| Modulus, p.s.i. ×10⁻⁵ | 5.3 | 2.25 |
| HDT (264 p.s.i.), ° C | 105 | 95 |
| Optical properties: | | |
| TWLT, percent | 90 | 88 |
| Haze, percent | 2.5 | 4.0 |
| After 48 hrs. at 100% R.H. and 50° C.: | | |
| TWLT, percent | 90 | 87 |
| Haze, percent | 3.0 | 4.5 |
| After 72 hrs. recovery RT: | | |
| TWLT, percent | 90 | 88 |
| Haze, percent | 2.8 | 4.5 |

The foregoing descriptions of the invention are set forth only by way of illustration. As will be readily apparent to those skilled in the art, other variations and modifications can readily be employed without departing from the spirit and scope of the invention, which is described above and embodied in the following claims.

What is claimed is:

1. A multi-phase, composite interpolymer comprising:
   (A) a first, elastomeric phase having a glass transition temperature of less than 10° C. polymerized from a monomer mix comprising at least about 50 weight percent of a member selected from the group consisting of alkyl and aralkyl acrylate and mixtures thereof, about 0.05 to 5.0 weight percent of cross-linking monomer, about 0.05 to 5.0 weight percent of graft-linking monomer, about 0 to 10.0 weight percent hydrophilic monomer, and the balance other copolymerizable ethylenically unsaturated monomer;

and further characterized in that the initial monomer mixture of said phase has present at least one member selected from the group consisting of alkyl and aralkyl acrylate and mixtures thereof, a cross-linking monomer and a graft-linking monomer, said cross-linking monomer being a polyethylenically unsaturated monomer having a plurality of addition polymerizable reactive groups all of which polymerize at substantially the same rate of reaction and wherein said graft-linking monomer being a polyethylenically unsaturated monomer having a plurality of addition polymerizable reactive groups, at least one of which polymerizes at a substantially different rate of polymerization from at least one other of said reactive groups, (B) a final, rigid thermoplastic phase polymerized in the presence of said elastomeric phase from a monomer mix comprising at least about 50 weight percent alkyl methacrylate, wherein said elastomeric phase and said thermoplastic phase have a minimum chemical attachment level of about 20 percent.

2. The composite interpolymer of claim 1 wherein said elastomeric phase is present in an amount of about 0.5 to 84 weight percent and said rigid phase is present in an amount of about 99.5 to 16 weight percent, based on the weight of the composite interpolymer.

3. The composite interpolymer of claim 1 wherein said first, elastomeric phase is polymerized from said monomer mix to the substantial depletion of the monomers and thereafter said last rigid thermoplastic phase is polymerized from said monomer mix, in the presence of said elastomeric phase, to the substantial depletion of said monomers.

4. The composite interpolymer of claim 3 wherein said monomer mixes are polymerized in aqueous emulsion.

5. The composite interpolymer of claim 1 wherein said elastomeric phase is a single phase polymerized from a monomer emulsion comprising about 50 to 99.9 weight percent alkyl acrylate, having 1 to 8 carbon atoms in said alkyl group, 0.05 to 5.0 weight percent cross-linking monomer, 0.05 to 5.0 weight percent graft-linking monomer, 0 to 10.0 weight percent hydrophilic monomer, 0 to 49.9 weight percent other acrylic monomers, and 0 to 40 weight percent other non-acrylic ethylenically unsaturated monomers.

6. The composite interpolymer of claim 5 wherein said alkyl acrylate is butyl acrylate.

7. The composite interpolymer of claim 5 wherein said cross-linking monomer is present in an amount of about 0.1 to 1.0 weight percent.

8. The composite interpolymer of claim 5 wherein said cross-linking monomer is selected from the group consisting of polyacrylic esters of polyols, polymethacrylic esters of polyols, poly(vinyl-substituted) aromatics, vinyl acrylate, vinyl methacrylate, and mixtures thereof.

9. The composite interpolymer of claim 5 wherein said graft-linking monomer is present in an amount of about 0.1 to 1.0 weight percent.

10. The composite interpolymer of claim 5 wherein said graft-linking monomer is selected from the group consisting of allyl esters of addition polymerizable ethylenically unsaturated carboxylic acids, polyallyl esters of polycarboxylic acids, and mixtures thereof.

11. The composite interpolymer of claim 5 wherein said graft-linking monomer is selected from the group consisting of allyl acrylate, allyl methacrylate, diallyl maleate, diallyl fumarate, diallyl itaconate, allyl acid maleate, allyl acid fumarate, allyl acid itaconate, and mixtures thereof.

12. The composite interpolymer of claim 5 wherein said hydrophilic monomer is present in an amount of about 0.5 to 5.0 weight percent.

13. The composite interpolymer of claim 5 wherein said hydrophilic monomer is selected from the group consisting of addition polymerizable amides of ethylenically unsaturated carboxylic acids, the hydroxy alkyl esters of ethylenically unsaturated carboxylic acids, and mixtures thereof.

14. The composite interpolymer of claim 5 wherein said hydrophilic monomer is selected from the addition polymerizable amides of methacrylic acid, the hydroxy alkyl esters of methacrylic acid, and mixtures thereof.

15. The composite interpolymer of claim 1 wherein said rigid thermoplastic phase is polymerized from a monomer mix comprising 50 to 100 weight percent alkyl methacrylate, wherein said alkyl group contains about 1 to 4 carbon atoms, 0 to 50 weight percent other acrylic monomer, and 0 to 40 weight percent of other ethylenically unsaturated monomers.

16. The composite interpolymer of claim 15 wherein said alkyl methacrylate is methyl methacrylate.

17. The composite interpolymer of claim 15 wherein said other acrylic monomer is selected from the group consisting of alkyl acrylates, alkyl methacrylates, aryl acrylates and methacrylates, alkyl acrylmides, alkyl methacrylamides, members of the foregoing group substituted with halogen, alkoxy, alkyl thio, cyano and amino, and mixtures thereof.

18. The composite interpolymer of claim 15 wherein said other ethylenically unsaturated monomer is selected from the group consisting of styrene, substituted styrene, vinyl esters, vinyl ethers, vinyl amides, vinyl ketones, vinyl halides, vinylidene halides, olefins, acrylonitrile, methacrylonitrile, and mixtures thereof.

19. A multi-phase composite interpolymer comprising:
(A) 0.5 to 84 weight percent of a first elastomeric phase polymerized from a single, initial monomer emulsion comprising about 50 to 99.9 weight percent butyl acrylate, about 0.1 to 1.0 weight percent cross-linking monomer, about 0.1 to 1.0 weight percent graft-linking monomer, about 0 to 5 weight percent hydrophilic monomer, about 0 to 49.9 weight percent of a copolymerizable acrylic monomer; and about 0 to 40 weight percent other copolymerizable ethylenically unsaturated monomer, said cross-linking monomer being a polyethylenically unsaturated monomer having a plurality of addition polymerizable reactive groups all of which polymerize at substantially the same rate of reaction and said graft-linking monomer being a polyethylenically unsaturated monomer having a plurality of addition polymerizable reactive groups, at least one of which polymerizes at a substantially different rate of polymerization from at least one other of said reactive groups; and, (B) 99.5 to 16 weight percent of a final, rigid thermoplastic phase polymerized in the presence of said elastomeric phase from a final monomer emulsion comprising about 50 to 100 weight percent methyl methacrylate, about 0 to 50 weight percent other acrylic monomer, and about 0 to 40 weight percent other ethylenically unsaturated monomer, wherein said elastomeric phase and said rigid thermoplastic phase have a minimum chemical attachment level of about 20 percent.

20. The composite interpolymer of claim 19 wherein said cross-linking monomer is selected from the group consisting of polyacrylic esters of polyols, polymethacrylic esters of polyols, poly(vinyl-substituted) aromatics, vinyl acrylate, vinyl methacrylate, and mixtures thereof.

21. The composite interpolymer of claim 19 wherein said graft-linking monomer is selected from the group consisting of allyl esters of addition polymerizable ethylenically unsaturated carboxylic acids, polyallyl esters of polycarboxylic acids, and mixtures thereof.

22. The composite interpolymer of claim 19 wherein said graft-linking monomer is selected from the group consisting of allyl acrylate, allyl methacrylate, diallyl maleate, diallyl fumarate, diallyl itaconate, allyl acid maleate, allyl acid fumarate, allyl acid itaconate, and mixtures thereof.

23. The composite interpolymer of claim 19 wherein said hydrophilic monomer is present in an amount of about 0.5 to 5.0 weight percent.

24. The composite interpolymer of claim 19 wherein said hydrophilic monomer is selected from the group consisting of addition polymerizable amides of ethylenically unsaturated carboxylic acids, the hydroxy alkyl esters of ethylenically unsaturated carboxylic acids, and mixtures thereof.

25. The composite interpolymer of claim 19 wherein said hydrophilic monomer is selected from the addition polymerizable amides of methacrylic acid, the hydroxy alkyl esters of methacrylic acid, and mixtures thereof.

26. The composite interpolymer of claim 19 wherein said other acrylic comonomer is selected from the group consisting of alkyl acrylates, alkyl methacrylates, aryl acrylates and methacrylates, alkyl acrylamides, alkyl methacrylamides, members of the foregoing group substituted with halogen, alkoxy, alkyl thio, cyano and amino, and mixtures thereof.

27. The composite interpolymer of claim 19 wherein said other ethylenically unsaturated comonomer is selected from the group consisting of styrene, substituted styrene, vinyl esters, vinyl ethers, vinyl amides, vinyl ketones, vinyl halides, vinylidene halides, olefins, acrylonitrile, methacrylonitrile, and mixtures thereof.

28. The composite interpolymer of claim 19 wherein said first, elastomeric phase is polymerized from said monomer mix to the substantial depletion of the monomers and thereafter said last, rigid thermoplastic phase is polymerized from said monomer mix, in the presence of said elastomeric phase, to the substantial depletion of said monomers.

29. A multi-phase composite interpolymer comprising:
(A) about 50 to 80 weight percent of a first elastomeric phase polymerized from a first monomer emulsion comprising about 50 to 94.3 weight percent n-butyl acrylate, about 5 to 20 weight percent styrene, about 0.1 to 1.0 weight percent butylene diacrylate, about 0.1 to 1.0 weight percent allyl methacrylate, and 0.5 to 5.0 weight percent of a hydrophilic monomer selected from the group consisting of addition polymerizable amides and hydroxy alkyl esters of methacrylic acid and mixtures thereof, and
(B) about 20 to 50 weight percent of a final, rigid thermoplastic phase, polymerized in the presence of said elastomeric phase from a monomer emulsion comprising about 90 to 98 weight percent methyl methacrylate and about 10 to 2 weight percent ethyl acrylate, wherein said elastomeric phase and said rigid thermoplastic phase have a minimum chemical attachment level of about 20 percent.

References Cited

UNITED STATES PATENTS

| | | | |
|---|---|---|---|
| 3,655,825 | 4/1972 | Souder et al. | 260—876 R |
| 3,450,796 | 6/1969 | Griffin | 260—885 |
| 3,562,235 | 2/1971 | Ryan | 260—885 |
| 3,678,133 | 7/1972 | Ryan | 260—876 R |
| 3,448,173 | 6/1969 | Ryan et al. | 260—876 R |
| 3,660,537 | 5/1972 | Fryd et al. | 260—885 |

MURRAY TILLMAN, Primary Examiner

J. ZIEGLER, Assistant Examiner

U.S. Cl. X.R.

260—876 R, 878 R, 881, 882, 883, 884

UNITED STATES PATENT OFFICE
CERTIFICATE OF CORRECTION

Patent No. 3,808,180　　　　　　　　　Dated April 30, 1974

Inventor(s) Frederick Hammann Owens

It is certified that error appears in the above-identified patent and that said Letters Patent are hereby corrected as shown below:

In the specification make the following changes:

Col. 1, line 26, delete comma

Col. 3, line 10, delete comma

Col. 3, line 27, instead of "between or the preparation" should be --between or for the preparation--

Col. 5, line 37, instead of "phosphate" should be --phosphate,--

Col. 6, line 3, delete comma

Col. 7, line 28, instead of "include" should be --includes--
　　　　line 58, instead of "group" should be --groups--
　　　　line 68, instead of "include" should be --including--
　　　　line 69, delete comma Col. 8, line 58, instead of "pivulates" should be --pivalate--

Col. 9, line 7, instead of "is" should be --are--

Col. 10, line 43, delete comma

Col. 11, line 56, delete and

Col. 13, line 13, instead of "of from" should be --of--

Col. 14, line 25, instead of "of of" should be --for--

Table I , instead of "MMA$^1$" should be --X$^1$--

Col. 16, line 20, delete )

Table IV, instead of "ft/lbs" should be --Izod impact at 23°C.: (ft.-lbs./inch) 1/8" milled notch--

(Continued on Page 2................)

UNITED STATES PATENT OFFICE
CERTIFICATE OF CORRECTION

Page 2

Patent No. 3,808,180                     Dated April 30, 1974

Inventor(s) Frederick Hammann Owens

It is certified that error appears in the above-identified patent and that said Letters Patent are hereby corrected as shown below:

Table IV, instead of "ft/lbs" should be --Tensile impact (ft.-lbs./inch$^2$) at 23°C--

Table V, instead of "ft. lb." should be --Izod impact (ft.-lb./inch), 23°C.: 1/8" milled notch--

Table V, instead of "(ft. lbs./in$^2$, 23°C" should be --Tensile impact (ft.-lb./in$^2$), 23°C.--

Col. 18, line 66, delete comma

Col. 19, line 26, instead of "polastomer" should be --elastomer-- line 29, instead of "presenting" should be --preventing--

Table VI, instead of "ft. lbs." should be --Izod impact (ft.-lbs./in.), 23°C 1/8" milled notch--

Table VI, instead of "ft. lbs." should be --Tensile impact (ft.-lbs./in.$^2$), 23°C Table VII, instead of "ft. lbs." should be --Izod impact (ft.-lbs./in.), 23°C 1/8" milled notch--

Table VII, instead of "ft. lbs." should be --Tensile impact (ft.-lbs./in.$^2$), 23°C and that said Letters Patent are hereby corrected as shown below:
UNITED STATES PATENT OFFICE
CERTIFICATE OF CORRECTION Patent No. 3,808,180        Dated April 30, 1974

Inventor(s) Frederick Hammann Owens

It is certified that error appears in the above-identified patent and that said Letters Patent are hereby corrected as shown below:

In the specification make the following changes:

Col. 1, line 49, instead of "polymethyl methacrylate" should be --poly(methyl methacrylate)--

Col. 2, line 64, instead of "likewse" should be --likewise--

Col. 3, line 48, instead of "themroplastic" should be --thermoplastic--

Col. 4, line 60, instead of "initiial" should be --initial--

Col. 7, line 19, instead of "impart" should be --impact--

Col. 10, line 58, instead of "chaarcter" should be --character--

Col. 16, line 67, instead of "VHT" should be --VHIT--

Table IV, instead of "Do" should be -- 1/8" molded notch--

Table V, instead of "Do" should be --1/8" molded notch--

Col. 19, line 45, instead of "where in" should be --wherein--

Table VI, instead of "Do" should be --1/8" molded notch--

Table VII, instead of "Do" should be --1/8" molded notch--

Col. 22, line 20, instead of "acrylmides" should be --acrylamides--

Signed and Sealed this seventh Day of October 1975

[SEAL]

Attest:

RUTH C. MASON
*Attesting Officer*

C. MARSHALL DANN
*Commissioner of Patents and Trademarks*